United States Patent
Hatcher et al.

(10) Patent No.: US 11,008,051 B2
(45) Date of Patent: May 18, 2021

(54) INTERLOCKING COMPOSITE CORE AND METHOD

(71) Applicant: Wabash National, L.P., Lafayette, IN (US)

(72) Inventors: Nick Hatcher, Lafayette, IN (US); Leonard W. Baker, Lafayette, IN (US); James A. Sweet, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 137 days.

(21) Appl. No.: 16/268,283

(22) Filed: Feb. 5, 2019

(65) Prior Publication Data

US 2019/0241220 A1    Aug. 8, 2019

Related U.S. Application Data

(60) Provisional application No. 62/627,093, filed on Feb. 6, 2018.

(51) Int. Cl.
*B62D 33/04* (2006.01)
*B32B 3/12* (2006.01)
*B62D 29/00* (2006.01)

(52) U.S. Cl.
CPC .............. *B62D 33/04* (2013.01); *B32B 3/12* (2013.01); *B32B 2605/00* (2013.01); *B62D 29/001* (2013.01)

(58) Field of Classification Search
CPC ...... B62D 33/04; B62D 29/001; B62D 33/02; B62D 29/005; B32B 3/12; B32B 2605/00
See application file for complete search history.

(56) References Cited

U.S. PATENT DOCUMENTS

| | | |
|---|---|---|
| 2,294,930 A | 9/1942 | Palmquist |
| 2,719,809 A | 10/1955 | Herts |
| 2,934,372 A | 4/1960 | Jewell |
| 3,072,225 A | 1/1963 | Cremer |
| 3,249,659 A | 5/1966 | Voelker |

(Continued)

FOREIGN PATENT DOCUMENTS

| | | |
|---|---|---|
| CA | 2165016 A1 | 6/1996 |
| EP | 2133184 A1 | 12/2009 |

(Continued)

OTHER PUBLICATIONS

Non-Final Rejection dated Sep. 1, 2009, for U.S. Appl. No. 11/859,014, 8 pages; obtained from USPTO records, now U.S. Pat. No. 9,908,315.

(Continued)

*Primary Examiner* — D Glenn Dayoan
*Assistant Examiner* — Melissa Ann Bonifazi
(74) *Attorney, Agent, or Firm* — Quarles & Brady LLP

(57) ABSTRACT

A shipping trailer wall panel includes a first partially hollow section, a second partially hollow section, and a reinforcing section. The first partially hollow section includes a first plurality of cell walls. The second partially hollow section is interlockingly connected to the first partially hollow section. The second partially hollow section includes a second plurality of cell walls. The reinforcing section is connected to one or more of the first partially hollow section and the second partially hollow section.

20 Claims, 12 Drawing Sheets

(56) References Cited

U.S. PATENT DOCUMENTS

| | | |
|---|---|---|
| 3,420,023 A | 1/1969 | Werner |
| 3,515,615 A | 6/1970 | Okada |
| 3,617,351 A | 11/1971 | Long |
| 3,817,671 A | 6/1974 | Lemelson |
| 4,128,369 A | 12/1978 | Kemerer et al. |
| 4,340,129 A | 7/1982 | Salyers |
| 4,557,100 A | 12/1985 | Gorges |
| 4,578,297 A | 3/1986 | Duncan |
| 4,701,369 A | 10/1987 | Duncan |
| 4,708,757 A | 11/1987 | Guthrie |
| 4,709,781 A | 12/1987 | Scherzer |
| 4,783,287 A | 11/1988 | Eichberger et al. |
| 4,796,397 A | 1/1989 | Capaul |
| 4,817,264 A | 4/1989 | Worthing |
| 4,879,152 A | 11/1989 | Green |
| 4,930,266 A | 6/1990 | Calhoun et al. |
| 4,940,279 A | 7/1990 | Abott et al. |
| 5,042,395 A | 8/1991 | Wackerle et al. |
| 5,066,531 A | 11/1991 | Legg et al. |
| 5,186,996 A | 2/1993 | Alts |
| 5,214,991 A | 6/1993 | Shimizu et al. |
| 5,275,848 A | 1/1994 | Mito et al. |
| 5,328,744 A | 7/1994 | Kaufmann et al. |
| 5,507,405 A | 4/1996 | Thomas et al. |
| 5,554,246 A | 9/1996 | Anwyll, Jr. |
| 5,580,636 A | 12/1996 | Kampmann et al. |
| 5,604,021 A | 2/1997 | Wagner |
| 5,698,308 A | 12/1997 | Sumiya et al. |
| 5,702,798 A | 12/1997 | Sugita et al. |
| 5,718,965 A | 2/1998 | Shiroeda et al. |
| 5,774,972 A | 7/1998 | Ehrlich |
| 5,779,847 A | 7/1998 | Groeger |
| 5,851,342 A | 12/1998 | Vydra et al. |
| 5,860,693 A | 1/1999 | Ehrlich |
| 5,899,037 A | 5/1999 | Josey |
| 5,919,545 A | 7/1999 | Giezendanner et al. |
| 5,979,684 A | 11/1999 | Ohnishi et al. |
| 5,997,076 A | 12/1999 | Ehrlich |
| 6,007,890 A | 12/1999 | DeBlander |
| 6,080,495 A | 6/2000 | Wright |
| 6,199,939 B1 | 3/2001 | Ehrlich |
| 6,220,651 B1 | 4/2001 | Ehrlich |
| 6,266,865 B1 | 7/2001 | Ehrlich |
| 6,276,748 B1 | 8/2001 | Gobessi et al. |
| 6,355,302 B1 | 3/2002 | Vandenberg et al. |
| 6,368,721 B1 | 4/2002 | Watanabe et al. |
| 6,383,559 B1 | 5/2002 | Nakamura et al. |
| 6,412,854 B2 | 7/2002 | Ehrlich |
| 6,537,413 B1 | 3/2003 | Hochet et al. |
| 6,546,694 B2 | 4/2003 | Clifford |
| 6,635,202 B1 | 10/2003 | Bugg et al. |
| 6,638,636 B2 | 10/2003 | Tucker |
| 6,680,017 B1 | 1/2004 | Koch et al. |
| RE38,508 E | 4/2004 | Wright |
| 6,824,851 B1 | 11/2004 | Locher et al. |
| 6,843,525 B2 | 1/2005 | Preisler |
| 6,852,386 B2 | 2/2005 | Nadezhdin et al. |
| 6,866,492 B2 | 3/2005 | Hauber et al. |
| 6,986,546 B2 | 1/2006 | Ehrlich |
| 7,014,253 B2 | 3/2006 | Oren |
| 7,017,981 B2 | 3/2006 | Strohmayr et al. |
| 7,056,567 B2 | 6/2006 | ONeill et al. |
| 7,069,702 B2 | 7/2006 | Ehrlich |
| 7,128,365 B2 | 10/2006 | Kiesewetter et al. |
| 7,155,797 B2 | 1/2007 | Kim |
| 7,255,822 B2 | 8/2007 | Bledsoe et al. |
| 7,338,696 B2 | 3/2008 | Rambaud et al. |
| 7,540,932 B2 | 6/2009 | Rub et al. |
| 7,553,435 B2 | 6/2009 | McCollum |
| 7,722,112 B2 | 5/2010 | Ehrlich |
| 7,722,122 B2 | 5/2010 | Mittelstadt |
| 7,758,487 B2 | 7/2010 | Elsayed et al. |
| 7,785,518 B2 | 8/2010 | Wirt et al. |
| 7,814,658 B2 | 10/2010 | Akishev et al. |
| 7,842,147 B2 | 11/2010 | Shen et al. |
| 8,087,494 B2 | 1/2012 | Palumbo et al. |
| 8,273,208 B2 | 9/2012 | Brinner |
| 8,336,933 B2 | 12/2012 | Nagwanshi et al. |
| 8,474,583 B2 | 7/2013 | Nagwanshi et al. |
| 8,524,351 B2 | 9/2013 | Ross |
| 8,584,433 B2 | 11/2013 | Masuda |
| 8,663,523 B2 | 3/2014 | Bradford et al. |
| 8,690,233 B2 | 4/2014 | Preisler et al. |
| 8,726,613 B2 | 5/2014 | Rhee et al. |
| 8,764,089 B2 | 7/2014 | Preisler et al. |
| 8,770,344 B2 | 7/2014 | Borroni |
| 8,795,465 B2 | 8/2014 | Preisler et al. |
| 8,795,807 B2 | 8/2014 | Preisler et al. |
| 8,808,827 B2 | 8/2014 | Preisler et al. |
| 8,808,828 B2 | 8/2014 | Preisler et al. |
| 8,808,829 B2 | 8/2014 | Preisler et al. |
| 8,808,830 B2 | 8/2014 | Preisler et al. |
| 8,808,831 B2 | 8/2014 | Preisler et al. |
| 8,808,833 B2 | 8/2014 | Preisler et al. |
| 8,808,834 B2 | 8/2014 | Preisler et al. |
| 8,808,835 B2 | 8/2014 | Preisler et al. |
| 8,834,985 B2 | 9/2014 | Preisler et al. |
| 8,845,947 B2 | 9/2014 | Wirt et al. |
| 8,852,711 B2 | 10/2014 | Preisler et al. |
| 8,859,074 B2 | 10/2014 | Preisler et al. |
| 8,883,285 B2 | 11/2014 | Preisler et al. |
| 8,945,327 B2 | 2/2015 | Stamp et al. |
| 8,995,138 B2 | 3/2015 | Preisler et al. |
| 9,010,834 B2 | 4/2015 | Preisler et al. |
| 9,126,537 B2 | 9/2015 | Preisler et al. |
| 9,283,895 B2 | 3/2016 | Sumi et al. |
| 9,308,945 B2 | 4/2016 | Preisler et al. |
| RE45,991 E | 5/2016 | Preisler et al. |
| 9,346,375 B2 | 5/2016 | Preisler et al. |
| 9,550,336 B2 | 1/2017 | Bradford |
| 9,908,315 B2 | 3/2018 | Speer |
| 10,239,566 B2 | 3/2019 | Bauer et al. |
| 2001/0011832 A1 | 8/2001 | Ehrlich et al. |
| 2002/0014302 A1 | 2/2002 | Fanucci et al. |
| 2002/0098341 A1 | 7/2002 | Schiffer et al. |
| 2002/0109377 A1 | 8/2002 | Ehrlich |
| 2002/0176960 A1 | 11/2002 | Nadezhdin et al. |
| 2003/0186029 A1 | 10/2003 | Ogawa et al. |
| 2004/0055248 A1 | 3/2004 | Grillos |
| 2004/0217631 A1 | 11/2004 | Ehrlich |
| 2005/0087899 A1 | 4/2005 | Coon et al. |
| 2005/0123720 A1 | 6/2005 | Suzuki et al. |
| 2005/0204561 A1 | 9/2005 | Kim |
| 2005/0225118 A1 | 10/2005 | Oren |
| 2005/0257893 A1 | 11/2005 | Rub et al. |
| 2006/0028050 A1 | 2/2006 | Ehrlich |
| 2006/0241542 A1 | 10/2006 | Gudnason et al. |
| 2007/0004813 A1 | 1/2007 | Shelby et al. |
| 2007/0056687 A1 | 3/2007 | Brinner |
| 2007/0196681 A1 | 8/2007 | Biggs et al. |
| 2007/0256379 A1 | 11/2007 | Edwards |
| 2008/0111393 A1 | 5/2008 | Ehrlich |
| 2008/0116718 A1 | 5/2008 | Lewallen et al. |
| 2009/0202785 A1 | 8/2009 | Meyer Zu Drewer et al. |
| 2009/0206631 A1 | 8/2009 | Lewallen et al. |
| 2009/0297763 A1 | 12/2009 | Ross |
| 2009/0324905 A1 | 12/2009 | Welch et al. |
| 2010/0227087 A1 | 9/2010 | Naldi |
| 2011/0089183 A1 | 4/2011 | Gundelsheimer |
| 2011/0095574 A1 | 4/2011 | Brown |
| 2011/0135862 A1 | 6/2011 | Sumi et al. |
| 2011/0250384 A1 | 10/2011 | Sumi et al. |
| 2012/0040135 A1 | 2/2012 | Werthen et al. |
| 2014/0044914 A1 | 2/2014 | Kurtz et al. |
| 2014/0127452 A1 | 5/2014 | Dietz et al. |
| 2014/0178636 A1 | 6/2014 | Wu et al. |
| 2014/0345795 A1 | 11/2014 | Speer |
| 2014/0349077 A1 | 11/2014 | Sumi et al. |
| 2015/0130220 A1 | 5/2015 | Preisler et al. |
| 2015/0130221 A1 | 5/2015 | Preisler et al. |
| 2015/0132532 A1 | 5/2015 | Preisler et al. |
| 2015/0145276 A1 | 5/2015 | Preisler et al. |
| 2015/0273810 A1 | 10/2015 | Carretta |

(56) References Cited

U.S. PATENT DOCUMENTS

| | | |
|---|---|---|
| 2015/0306840 A1 | 10/2015 | Ferguson, Jr. |
| 2016/0176149 A1 | 6/2016 | Manderfeld et al. |
| 2019/0119862 A1* | 4/2019 | Penland, Jr. .............. B32B 3/12 |

FOREIGN PATENT DOCUMENTS

| | | |
|---|---|---|
| JP | H0387461 A | 4/1991 |
| JP | 2003285397 A | 10/2003 |
| JP | 2005238622 A | 9/2005 |
| WO | 9014943 A1 | 12/1990 |
| WO | 9300845 A1 | 1/1993 |
| WO | 0024559 A1 | 5/2000 |
| WO | 0244493 A1 | 6/2002 |
| WO | 2005077654 A1 | 8/2005 |
| WO | 2006128632 A1 | 12/2006 |
| WO | 2008141688 A2 | 11/2008 |
| WO | 2010050242 A1 | 5/2010 |
| WO | 2010069994 A2 | 6/2010 |

OTHER PUBLICATIONS

Non-Final Rejection dated Oct. 1, 2013, for U.S. Appl. No. 13/204,762, 18 pages; obtained from USPTO records, now U.S. Pat. No. 9,908,315.
Final Rejection dated Apr. 9, 2014, for U.S. Appl. No. 13/204,762, 17 pages; obtained from USPTO records, now U.S. Pat. No. 9,908,315.
International Search Report and Written Opinion issued in corresponding PCT/US2018/018151 dated Apr. 5, 2018, 6 pages.
International Search Report and Written Opinion issued in corresponding PCT/US2018/015984 dated Apr. 19, 2018, 7 pages.

\* cited by examiner

INTERLOCKING COMPOSITE CORE AND METHOD

CROSS REFERENCE TO RELATED APPLICATIONS

This application claims the benefit of U.S. Provisional Application No. 62/627,093 filed on Feb. 6, 2018, which is incorporated herein by reference in its entirety.

BACKGROUND

Many storage trailers, including those for commercial trucking, consist of sidewalls and doors constructed from composite materials. Composite materials may have a plastic core disposed between two outer metal sheets. For example, Wabash National Corporation of Lafayette, Ind. makes DURAPLATE® composite panels that have a high-density polyethylene plastic core (HDPE) fastened between two high-strength, high-tension steel plates.

Cores of composite panels may be constructed from a plurality of structures including a network of cells. One such network of cells is made from an arrangement of hexagons that produce a honeycomb structure with alternating geometric structures and air pockets. In some instances, partially hollow cores use less plastic than completely solid and/or foamed plastic and/or foamed plastic cores, cutting down on material costs. Additionally, the partially hollow cores weigh less than completely solid cores and have higher strength to weight ratios. However, some cores may lack the strength required for mechanical fastening used in many commercial applications. Further, due to process machinery limitations, in many cases the partially hollow cores may be only produced at a predetermined width and/or a predetermined length, but may not be produced at a desired length and/or a desired width suitable for the end use application.

SUMMARY

Some embodiments provide a shipping trailer wall panel comprising a first partially hollow section, a second partially hollow section, and a reinforcing section. The first partially hollow section includes a first plurality of cell walls. The second partially hollow section is interlockingly connected to the first partially hollow section. The second partially hollow section includes a second plurality of cell walls. The reinforcing section is connected to one or more of the first partially hollow section and the second partially hollow section.

Further embodiments provide a composite panel comprising an inner sheet, an outer sheet, and a core. The outer sheet is opposite the inner sheet and the core is disposed between the inner sheet and the outer sheet. The core comprises a first honeycomb section including a plurality of cell walls, and a second reinforcing section including a plurality of primary protrusions. The plurality of primary protrusions are configured to interlock with the cell walls.

Additional embodiments provide a trailer comprising a bottom rail, a top rail, and a plurality of composite panels. The top rail is opposite the bottom rail. The plurality of composite panels are disposed between the top rail and the bottom rail. Each composite panel comprises a partially hollow section including a plurality of cell walls and a reinforcing section including a plurality of primary protrusions. The plurality of primary protrusions are configured to interlock with the cell walls.

DETAILED DESCRIPTION

Figure 1:
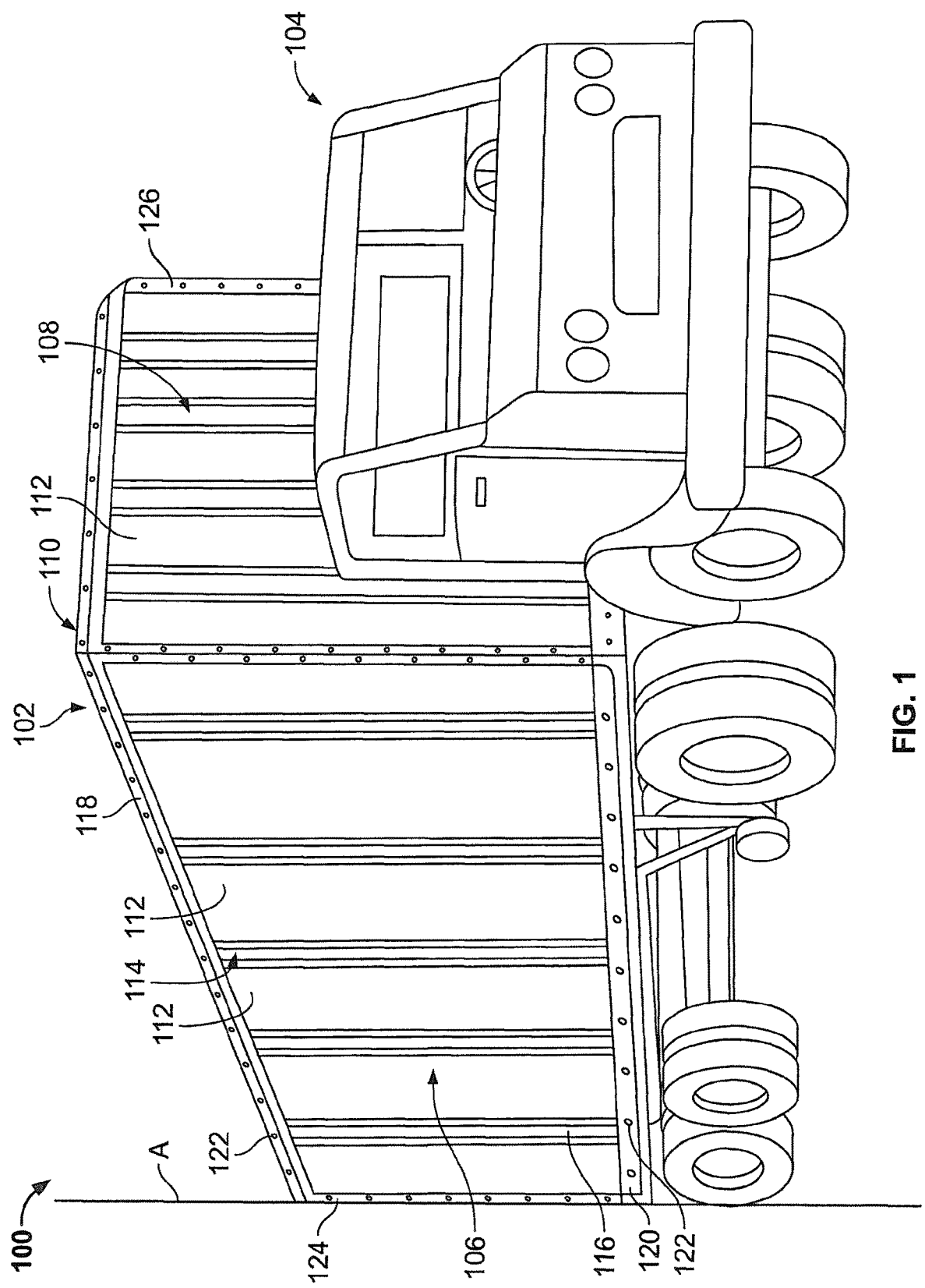
FIG. 1 is a perspective view of a trailer having sidewalls that include a plurality of composite panels.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 depicts a tractor trailer assembly 100 including a trailer 102 designed to carry cargo (e.g., a shipping trailer) and a tractor 104 having an engine and a cab section. The trailer 102 may be substantially rectangular and may be defined by one or more sidewalls 106, a front end wall assembly 108, a roof assembly 110, and a rear end wall assembly (not shown), which may include an overhead door. Further, the trailer 102 may be defined by a floor assembly (not depicted) disposed opposite the roof assembly 110. Alternatively, the rear end wall assembly may include two doors mounted in a conventional manner such that the doors are hingedly coupled to and swing between an open position and a closed position. Further, the trailer 102 may be releasably coupled to the tractor 104 by conventional means, such as a fifth wheel, for example.

Portions of each sidewall 106, the front end wall assembly 108, the roof assembly 110, the floor assembly, and/or the rear end wall assembly of the trailer 102 may be made from one or more composite panels 112. Thus, in some instances, the composite panels 112 may be referred to as shipping trailer wall panels. The composite panels 112 may be coupled to each other using a number of different fasteners, joint configurations, seams, and/or connection members described in more detail below. In one embodiment, the composite panels 112 may be coupled to each other via joint configurations 114 including a logistics plate (not shown) and/or a splicing plate 116. In some embodiments, the composite panels 112 may be coupled together along a longitudinal axis using rivets, screws, welding adhesives or the like.

Additionally, as shown in FIG. 1, the composite panels 112 may be coupled to a top rail 118 and a bottom rail 120 using a plurality of fasteners 122, e.g., rivets, screws, adhesives, or the like. One or more composite panels 112 may also be coupled to one or more vertically oriented rails 124, 126 that are aligned with and substantially parallel to a longitudinal axis A of the trailer 102 using a fastener 122, e.g., a rivet. The vertical rails 124, 126 may be disposed between the panels 112 at various points along the length of the trailer 102. Other joint configurations and other fasteners, for example, screws, bolts, nails, welding adhesives, and the like, may also be used to couple adjacent composite panels 112 together, composite panels 112 to the top rail 118 and/or the bottom rails 120, and/or the composite panels 112 to the vertical rails 124, 126. It should be understood and appreciated that the composite panels 112 may be used in any suitable application, alternatively or in addition to use with shipping trailers (e.g., construction, manufacturing, automotive, marine, etc.).

Figure 2:
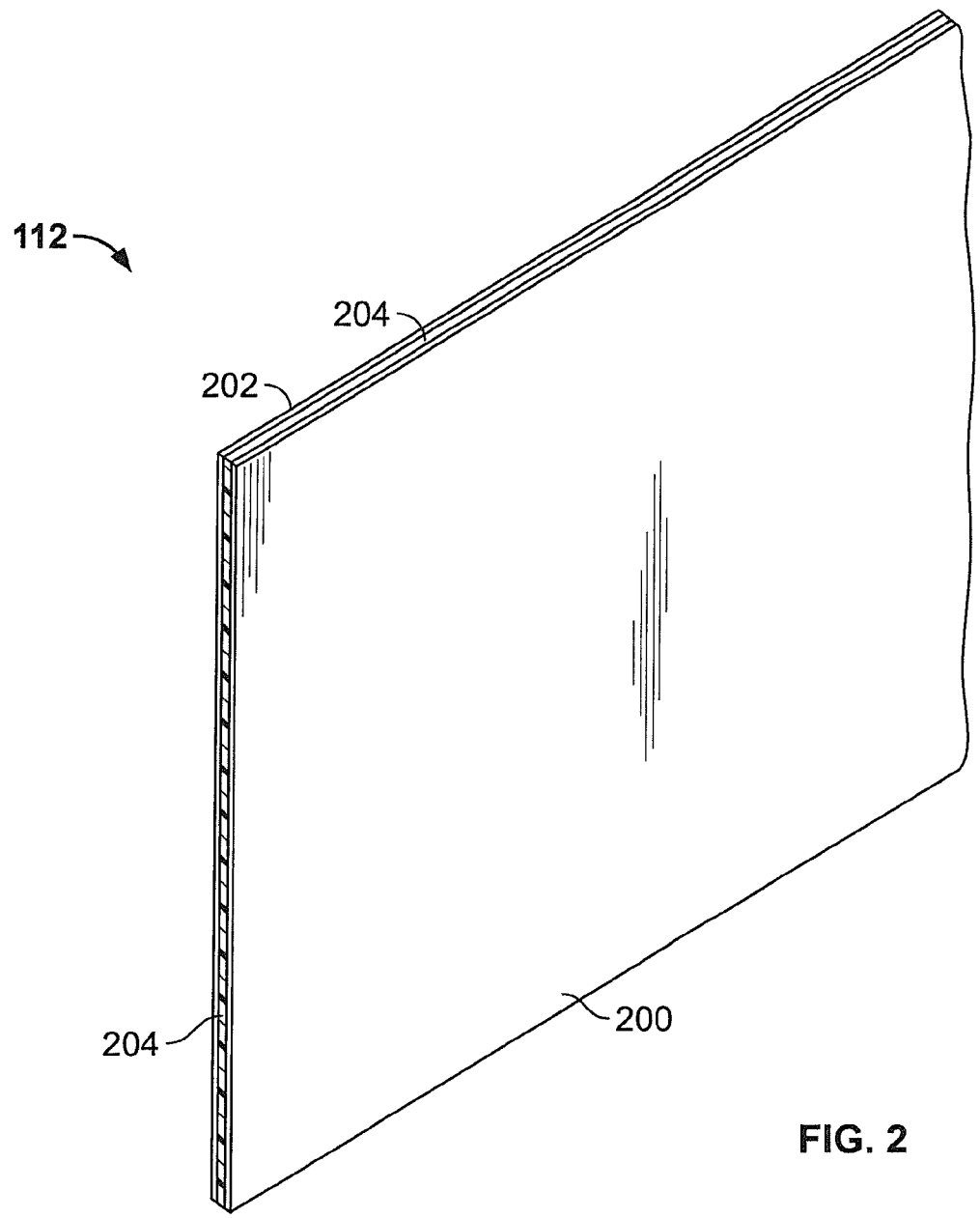
FIG. 2 is an isometric view of one of the composite panels of FIG. 1 having two outer sheets and an inner core member.

FIG. 2 depicts a portion of one composite panel 112 that is provided in the form of an inner sheet 200, an outer sheet 202 positioned opposite of the inner sheet 200, and a core member 204 positioned between the inner sheet 200 and the outer sheet 202. The inner sheet 200 and the outer sheet 202, independently, may be formed from high-strength, high-tension steel plates, aluminum, other metals, and/or other alloys. In further embodiments, the inner sheet 200 and the outer sheet 202, independently, may be formed from a reinforced plastic or polymer, such as a fiber-reinforced plastic and/or a glass-reinforced plastic. The inner sheet 200 and outer sheet 202 may also be formed from other materials including, for example, bioplastics, wood, thermoplastic, polymers, and other materials. Further, the core member 204 may be provided in the form of a thermoplastic material that will be described in more detail below.

The inner sheet 200 and the outer sheet 202 may be bonded to the core member 204 by a suitable adhesive layer (not shown). In one embodiment, the inner sheet 200 and the outer sheet 202 are bonded to the core member 204 by a suitable flexible adhesive bonding film such as, for example, modified polyethylene. Further, the inner sheet 200 and the outer sheet 202 may also be bonded to the core member 204 using various welding techniques. It should be understood that other suitable adhesives or joining mechanisms may also be used as well. When fully assembled, the outer sheets 202 of each panel 112 cooperate to form an exterior surface of the sidewalls 106, the front end wall assembly 108, and/or the rear end wall assembly (not shown) of the trailer 102, while the inner sheets 200 of each panel 112 cooperate to form an interior surface of the sidewalls 106, the front end wall assembly 108, and/or the rear end wall assembly (not shown) of the trailer 102.

Figure 3:
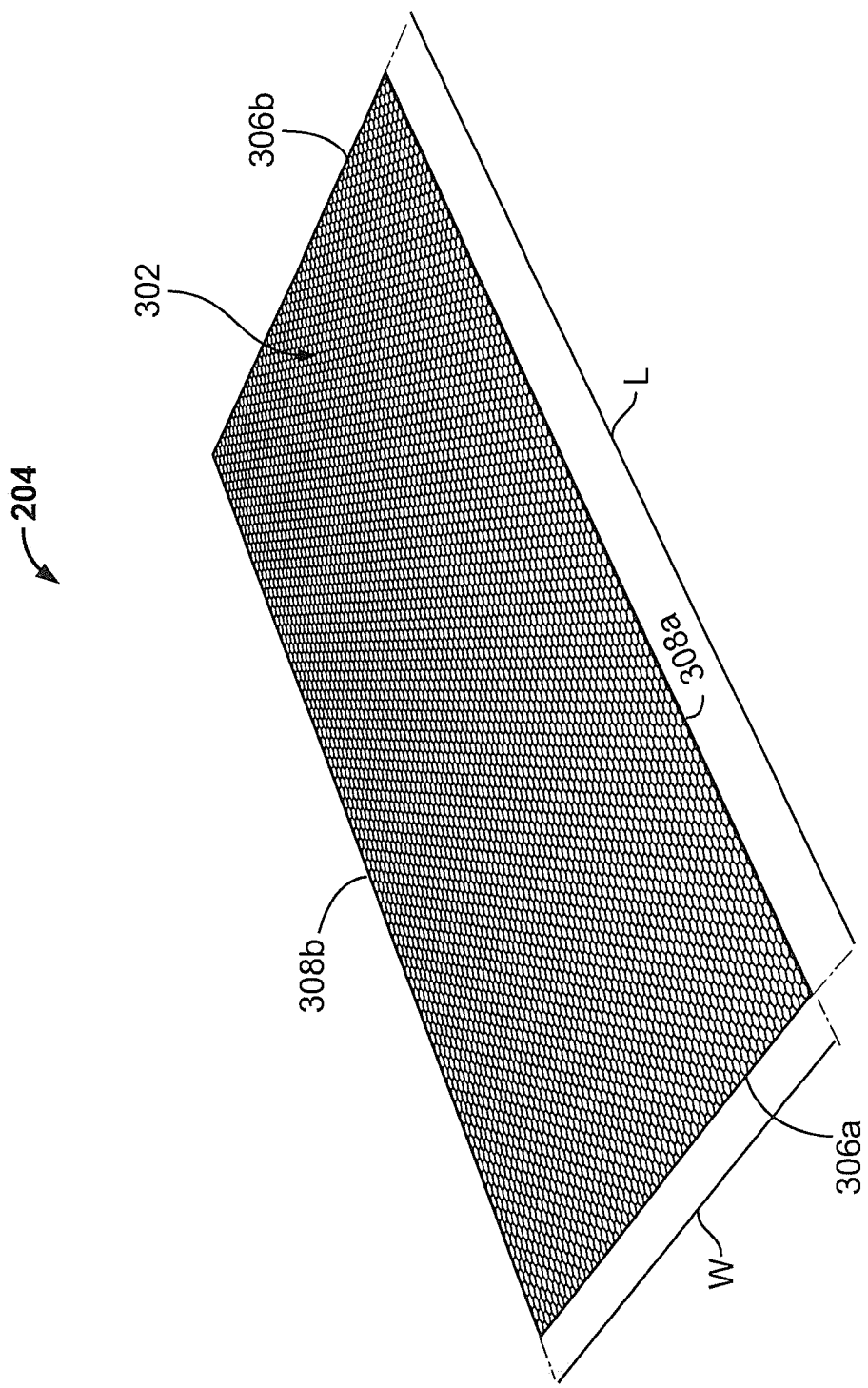
FIG. 3 is an isometric view of the inner core member of the composite panel of FIG. 2 including a primary structure comprising a network of cells.
Figure 4:
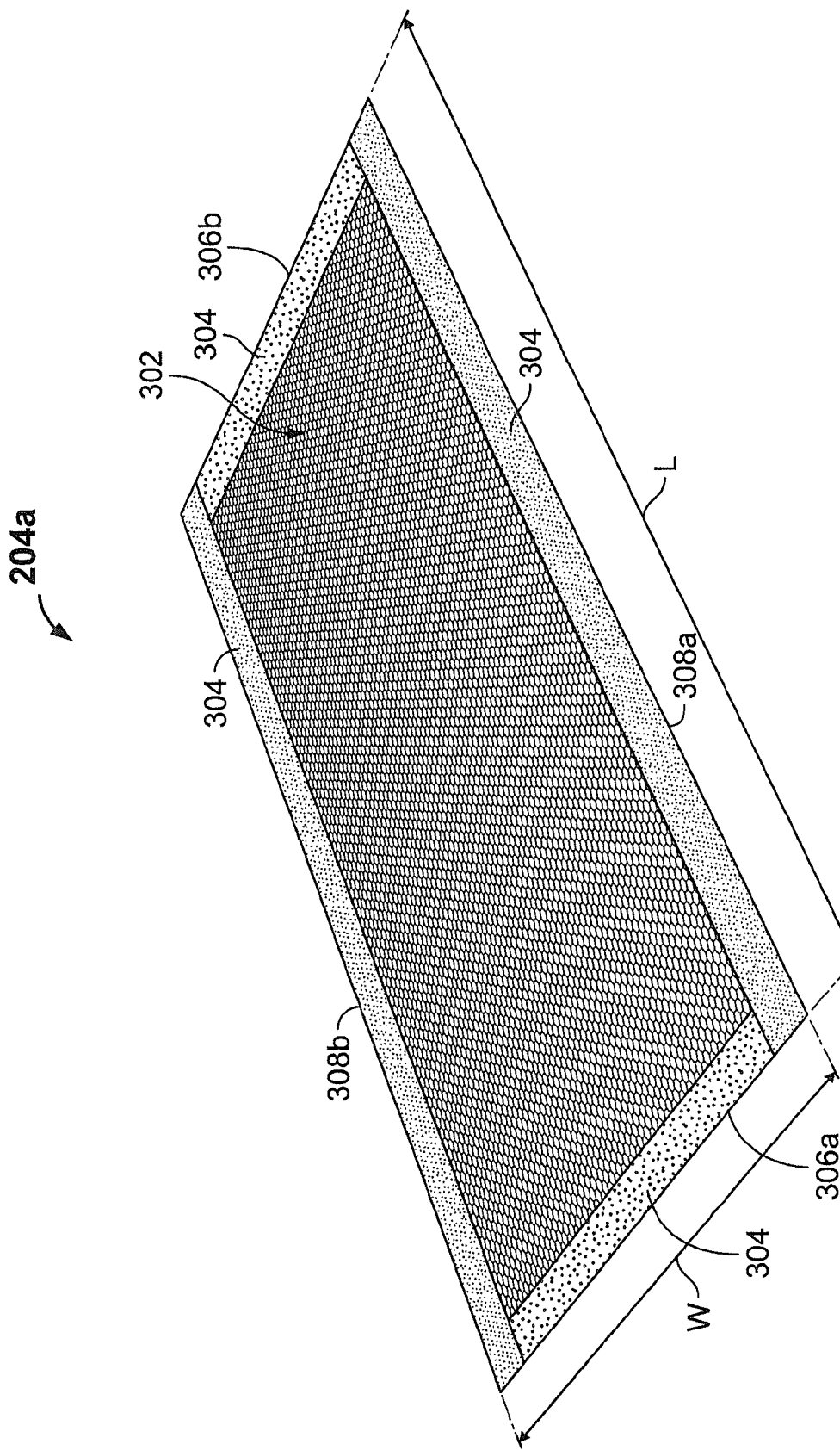
FIG. 4 is an isometric view of alternative embodiment of the inner core member of the composite panel of FIG. 2 including a primary structure and a reinforced material.

FIGS. 3 and 4 depict embodiments the core member 204, 204a of a single composite panel 112, which is substantially rectangular and generally corresponds to a shape and size of each of the inner sheet 200 and the outer sheet 202. In the embodiment shown in FIG. 3, the core member 204 may include a partially hollow or first section 302 that may include a network of cells. Further, in the embodiment shown in FIG. 4, the core member 204a may include the first section 302 and may further include a reinforced section or second section 304. Further, the core members 204, 204a may be defined by a first end 306a and a second end 306b disposed at opposing ends of the core member 204, and a first lateral edge 308a and a second lateral edge 308b, on opposing sides of the core member 204. Illustratively, the first end 306a and the second end 306b may define a length dimension L of the core member 204, and the first and the second lateral edges 308a, 308b may define a width dimension W of the core member 204.

The core members 204, 204a may be provided in a variety of shapes and sizes. With reference to FIGS. 3 and 4, the length dimension L and the width dimension W of the core members 204, 204a may generally define the size and shape of the core member 204. In some embodiments, the length dimension L may range between about 1 meter to about 16 meters. In particular embodiments, the length dimension L may range from about 2 meters to about 4 meters, or between about 2.5 meters to about 3 meters. Further, in some embodiments, the width dimension W may range between about 0.5 meters to about 4 meters. In particular embodiments, the width dimension W may range between about 0.75 meters to about 2 meters, or between about 1 meter to about 1.5 meters. The core members 204, 204a may also have a predetermined height or thickness. In some embodiments, the core members 204, 204a have a predetermined thickness between about 3 millimeters to about 15 millimeters and, in particular embodiments, the core members 204, 204a may have a predetermined thickness between about 5 millimeters to about 10 millimeters. It should be understood that the length, width, and thickness dimensions of the core members 204, 204a may be modified such that the core members 204, 204a would be suitable in other applications referenced herein.

As noted above, the core member 204a may also be defined by a first section 302 and one or more second sections 304. The second section 304 may be structurally different with respect to the first section 302 and/or each other. Further, the second section 304 may be materially or compositionally different with respect to the first section 302 and/or to another second section 304.

More specifically, in one embodiment, the first section 302 may comprise a continuous honeycomb thermoplastic cell network, e.g., a honeycomb structure. In a particular embodiment, the continuous honeycomb thermoplastic cell network may include a plurality of hexagonal cells that are substantially hollow. In other embodiments, the first section 302 may include a cell network of polygonal, arcuate, and/or sinusoidal cells that are substantially hollow. In other words, the cell network includes substantially hollow interconnected cells of any shape (e.g., square, ovate, polygonal, etc.). Although the first section 302 is typically described as a honeycomb structure throughout, it should be appreciated that the first section 302 may comprise another material that is defined by a lower density than that of the material of the second section 304.

The second section 304 of the core member 204 may be generally defined by a reinforced material. In some embodiments, the reinforced material is a solid or a substantially solid material and, in particular embodiments, is a solid or substantially solid plastic material.

The second sections 304 may be disposed around the entire perimeter of the core member 204*a*. In one embodiment, as shown in FIG. 4, the second section 304 includes two strips of solid plastic reinforced material located adjacent both the first end 306*a* and the second end 306*b* of the core member 204, and two strips of solid plastic reinforced material located adjacent both the first lateral edges 308*a* and the second lateral edge 308*b*. The second section 304 may also be defined by a greater volumetric density as compared to the first section 302. Further, the second sections 304 may also be disposed within the core member 204. In fact, the second sections 304 may be placed anywhere within or around the core member 204 where additional support is desired. For example, the second sections 304 may be strategically placed in areas to prevent bolts, rivets, or the like from crushing the core member 204. Alternatively, in other embodiments, the second sections 304 may only be disposed on one edge of the core member 204.

In some embodiments, the first section 302 extends in the width dimension W and/or the length dimension L of the core member 204 almost the entire length and/or width thereof, but terminates adjacent the second sections 304, described in more detail below. In these embodiments, the second sections 304 may define the first end 306*a*, the second end 306*b*, the first lateral edge 308*a*, and/or the second lateral edge 308*b* of the core member 204.

Further, the second sections 304 may extend a predetermined distance above, below, to the left, and/or to the right of the first section 302. In particular embodiments, the second section 304 may extend above the first section 302 between about 1 centimeter to about 100 centimeters, or between about 1 centimeter to about 50 centimeters, or between about 2 centimeters to about 25 centimeters. The second section 304 may extend below the first section 302 between about 1 centimeter to about 100 centimeters, or between about 1 centimeter to about 50 centimeters, or between about 10 centimeters to about 30 centimeters. Further, the second section 304 may extend to the left of the first section 302 between about 1 centimeter to about 100 centimeters, or between about 1 centimeter to about 50 centimeters, or between about 3 centimeters to about 15 centimeters. The second section 304 may extend to the right of the first section 302 between about 1 centimeter to about 100 centimeters, or between about 1 centimeter to about 50 centimeters, or between about 3 centimeters to about 15 centimeters.

In some embodiments, the first section 302 (i.e., the honeycomb structure) comprises over about 50%, over about 60%, over about 70%, over about 80%, or over about 90% of the entire volume of the core member 204. The first section 302 may be designed to reduce the weight of the core member 204, as compared to a core member having a completely solid core structure, while maintaining desired core strength. Further, the first section 302 may use less plastic as compared to a solid plastic core material. It should be understood that the honeycomb cell network may be formed from other hollow webbed structures (including, for example, squares, parallelograms, triangles, and the like) and is not be limited to hexagonal honeycomb structures. In other embodiments, the first section 302 of the core member 204 may comprise other materials that are at least partially perforated, mesh, embossed, or any other type of material that could be thermally welded or tie layer bonded to the inner sheet 200 and/or the outer sheet 202.

As noted above, the core member 204*a* may have one or more reinforced plastic materials, i.e., second sections 304, which may be welded or otherwise secured to the first section 302 at outer edges or within interior areas thereof. The second section 304 may be designed and strategically located to be coupled to the top rail 118 and/or the bottom rail 120 of the trailer 102 by a suitable joining member or fastener 122, such as the aforementioned bolts or rivets, for example. In particular, the addition of one or more solid reinforced materials or second sections 304 into the core member may significantly increase the strength of the composite panel 112 in certain desired locations, e.g., a location of fastening. Additionally, the solid reinforced material or second sections 304 may increase the fastener pull out strength when compared to composites that comprise complete honeycomb material cores. In effect, the second sections 304 may be positioned so that when the composite panel 112 is attached to the top rail 118, for example, the fastener 122 extends through the second section 304 of the core member 204, as opposed to extending through the first section 302.

The first section 302 and the second section 304 of the core member 204 may be formed from a thermoplastic, such as a high density polyethylene, i.e., HDPE, or a high density polypropylene. However, the first section 302 and second section 304 may be formed from other suitable materials. For example, the first section 302 and the second section 304 may each, individually, be formed from a low density polyethylene, i.e., LDPE, a polyethylene terephthalate, i.e., PET, a polypropylene, i.e., PP, or the like. Although the materials of the first section 302 and the second section 304 of the core member 204*a* may comprise the same material, the process and methodology to form the first section 302 and the second section 304 of the core member 204 may be different with respect to each other and is described in more detail below. As a result, the first section 302 and the second section 304 of the core member 204 may be defined by different properties including, for example, density, tensile strength, and the like.

Figure 5:
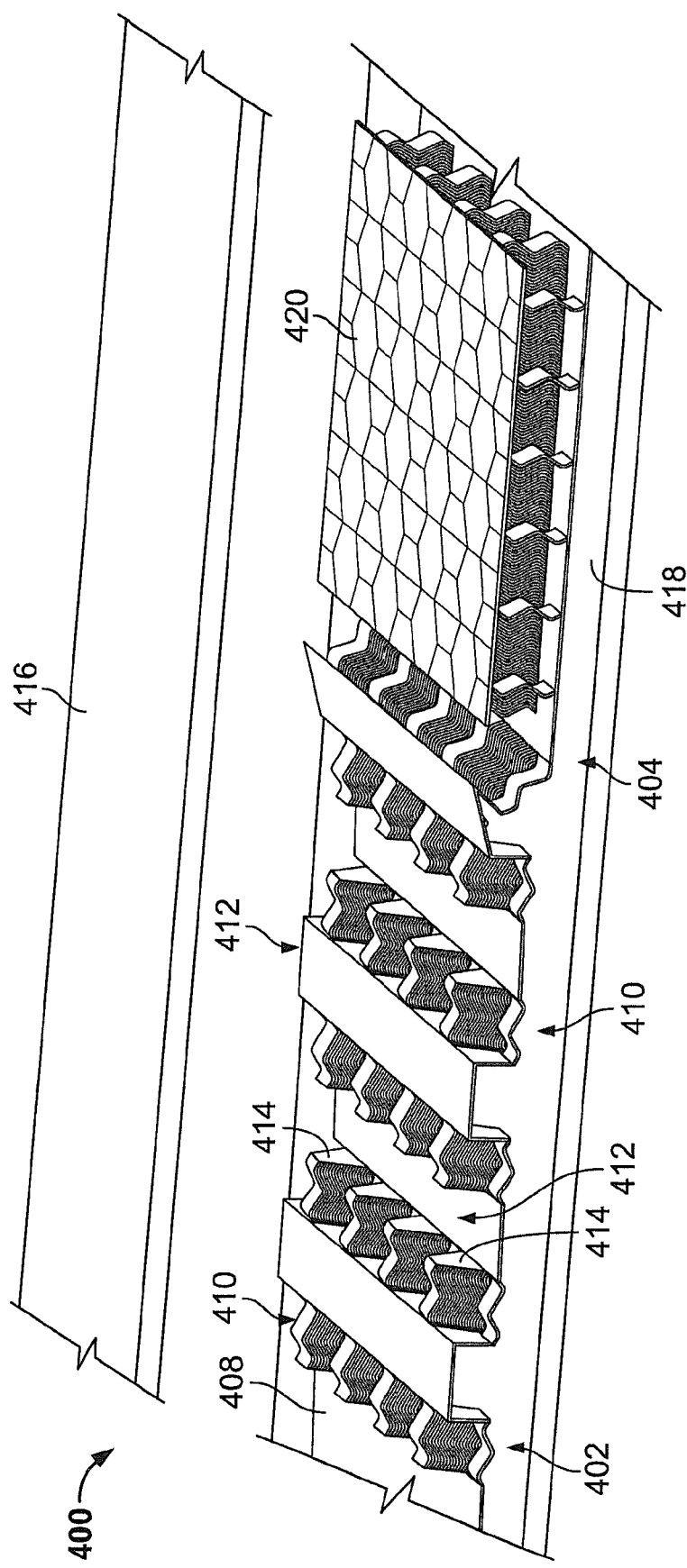
FIG. 5 is an isometric view of a portion of a plurality of panels on a production line.

FIG. 5 depicts and illustrative process or method 400 for making the first section 302 of the core member 204. Exemplary processes or methods for making a honeycomb structure are described in detail in International Publication No. WO 2008/141688 A2, the entirety of which is hereby incorporated by reference herein. In most embodiments, a flat sheet 408 of thin deformable material and of a predetermined width and/or a predetermined length may be fed to the process 400 as a starting material. For example, the thin sheet 408 may be one of a thermoplastic polymer, a low density polyethylene, a polyethylene terephthalate, a polypropylene, a fiber composite, a plastically deformable paper, a deformable metal sheet, or the like.

Initially, the thin sheet 408 is vacuum formed into alternating pairs of matching shapes. In particular embodiments, the sheet 408 may be intermittingly vacuum formed to produce a plurality of deformed regions 410 and a plurality of non-deformed regions 412 positioned therebetween. The deformed regions 410 are generally three-dimensional and include one or more individual cells 414 of predetermined shape and size. As will be described in greater detail below, the predetermined shape and size of the cells 414 determine the structure of the first section 302 of the core member 204. For example, in a particular embodiment shown in FIG. 5, the cells 414 are substantially trapezoidal to produce, when folded, a honeycomb structure. Alternative embodiments may include a cell with a polygonal structure, a sinusoidal or arcuate shape, a rectangular design, or the like. Further, the walls of the cells 414 may be substantially linear, bowed, curved, etc. to produce the first section 302 with a desired structure.

In the next step, the vacuum formed mating pairs or cells 414 enter onto a conveyor belt. In some embodiments, the conveyor belt includes an upper conveyor belt 416 and a lower conveyor belt 418 that are running at a speed that is relatively slower than a speed of the incoming material. The slower speed of the lower conveyor belt 418 may cause the incoming vacuum formed mating pairs or cells 414 to bunch up, wrinkle, and/or stand up to produce a plastic network 420, e.g., a plastic honeycomb network. For example, in the embodiment shown in FIG. 5, the material may be formed into alternating pairs of trapezoidal cells that, when folded, form completed hexagonal shapes.

Finally, the bunched up honeycomb structure or plastic network 420 enter a second conveyor belt (not shown). In particular embodiments, the second conveyor belt may be provided as opposed conveyor belts, i.e., one conveyor positioned above the plastic network 420 and one conveyor positioned below the plastic network 420. Further, the conveyor belts may apply a predetermined amount of heat at a predetermined temperature and/or a predetermined amount of force may be applied at a predetermined pressure to consolidate and/or weld the plastic network 420 together to produce the first section 302. Additional heat and/or pressure may be applied in step 406 to calibrate the first section 302 to the desired final thickness and/or the desired final height.

The predetermined temperature applied may range between about 40° C. to about 250° C. In some embodiments, the predetermined temperature may range between about 100° C. to 200° C. or between about 160° C. to about 190° C. Further, the predetermined pressure may range from about 1 MPa to about 100 MPa. In particular embodiments, the predetermined pressure may range between about 15 MPa to about 40 MPa, or between about 25 MPa to about 30 MPa. The heat and/or pressure may be applied for a predetermined amount of time in order to consolidate and/or weld the plastic network 420 together and/or weld the first section 302 to the second section 304. Further, the heat and/or pressure may be applied for a predetermined amount of time in order to calibrate the first section 302 to a desired thickness.

As previously noted, in some instances, the thin sheet 408 may be fed to the process 400 at a predetermined width and/or at a predetermined length. Therefore, after process 400, a first section 302 may be produced at the predetermined width and/or the predetermined length. However, in some instances, the predetermined width and/or the predetermined length of the first section 302 produced by the process 400 may be less than a desired width and/or a desired length, or may be less than the width W and/or the length.

In order to produce the core member 204 at the width W and/or the length L suitable for a particular application, the core member 204 may include one or more seams 450 (see FIG. 8) designed to facilitate attachment of various sections of the core member 204. In particular embodiments, the seams 450 may allow one or more first sections 302 to attach or connect with another first section 302. As such, the seam 450 may act to increase the width W and/or the length L of the core member 204.

Figure 6:
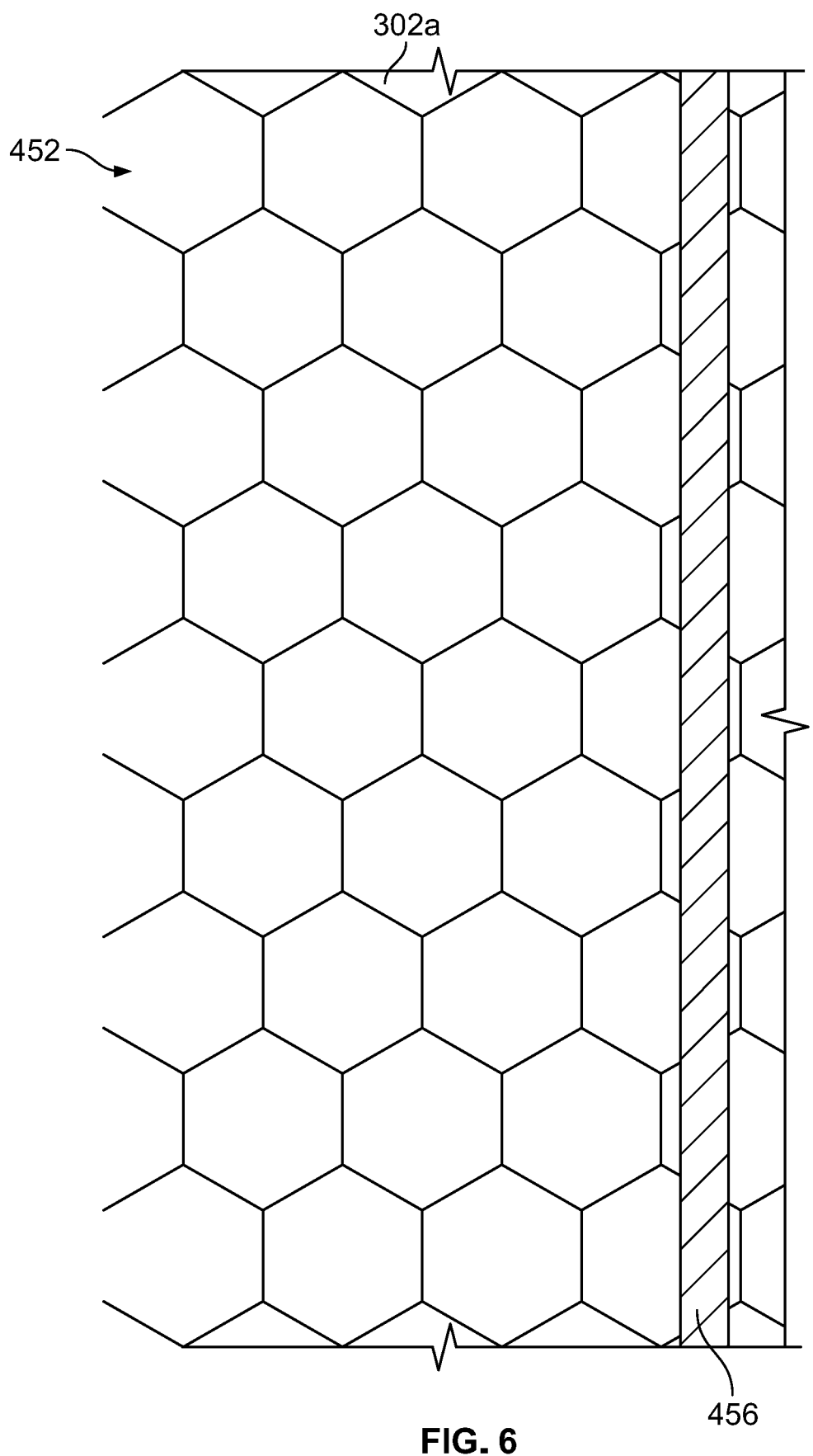
FIG. 6 is a top plan view of a first portion of the inner core member of FIG. 3.
Figure 7:
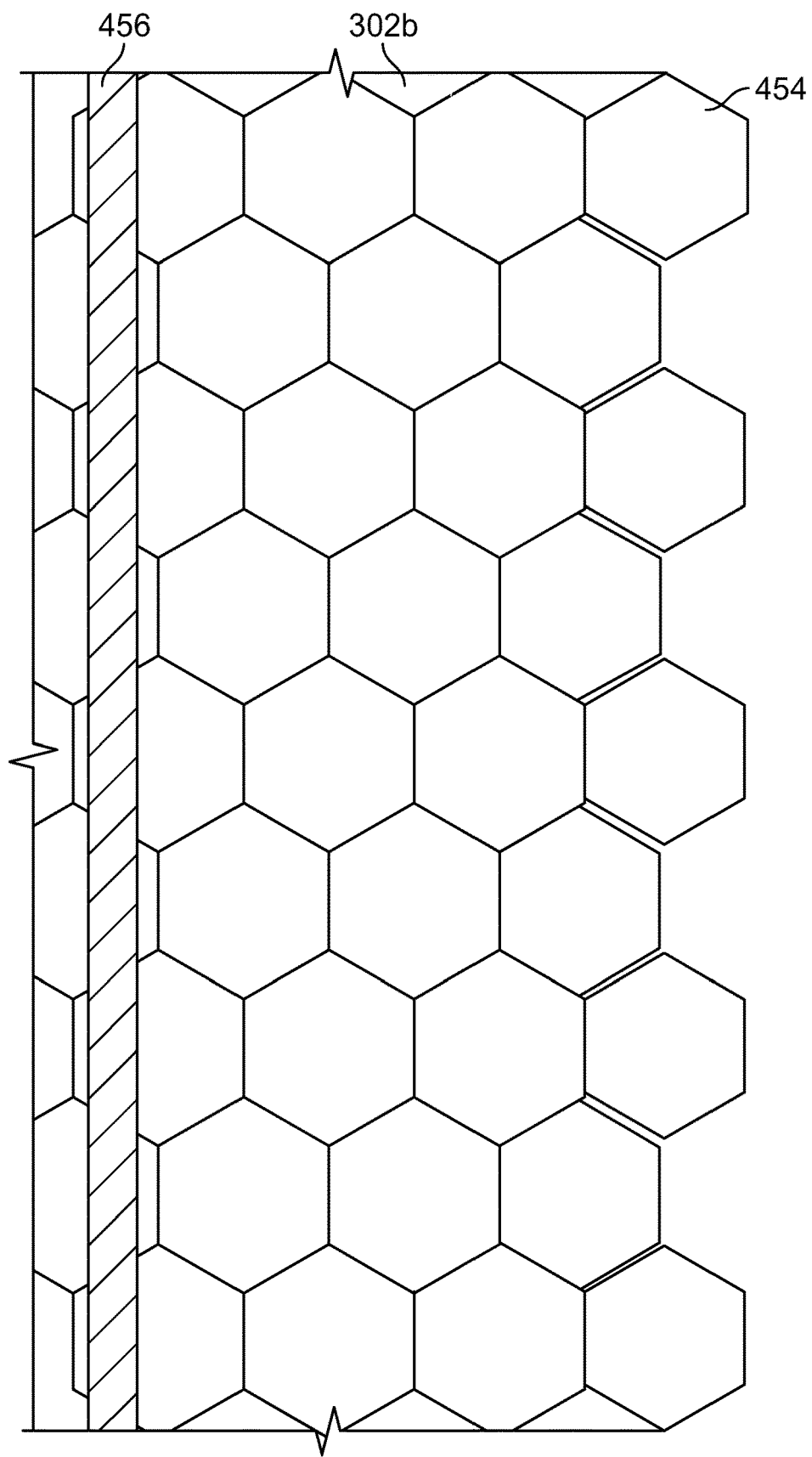
FIG. 7 is a top plan view of a second portion of the inner core member of FIG. 3.
Figure 8:
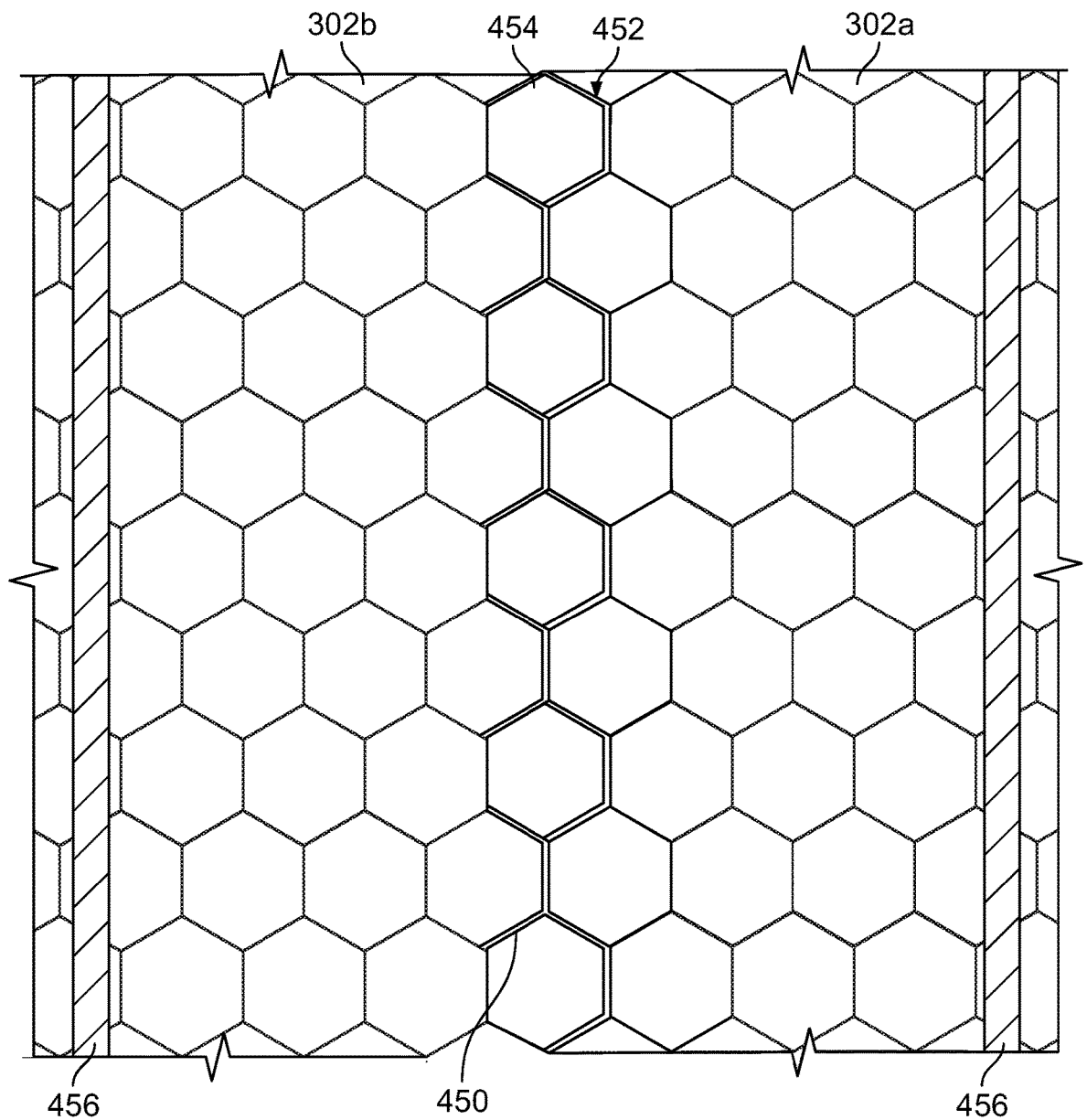
FIG. 8 is a top plan view of the first and second portions of the inner core member of FIGS. 6 and 7 in an assembled state including a seam.

As shown in FIG. 6, a first portion 302a of the first section 302 may include a first connection mechanism 452. Additionally, as shown in FIG. 7, a second portion 302b of the first section 302 may include a second connection mechanism 454. In some embodiments, the first connection mechanism 452 and the second connection mechanism 454 are designed to interlockingly connect to form the seam 450, as shown in FIG. 8. In some embodiments, the first portion 302a and the second portion 302b may be joined to one another via linking portions of honeycomb material adhesively bonded to the first portion 302a and the second portion 302b (not shown). In such embodiments, the linking portions may be sourced from scraps generated during productions of the first section 302.

In the particular embodiment shown in FIGS. 6-8, the first connection mechanism 452 is a female locking member and the second connection mechanism 454 is a male connection member that may be inserted into the female locking member or first connection mechanism 452. In alternative embodiments, the first connection mechanism 452 and/or the second connection mechanism 454 may be other interlocking members, adhesive components, or any other components that may act to connect the first sections 302 together to form the seam 450. In order to form the first connection mechanism 452 and/or the second connection mechanism 454, the first section 302 may be cut at predetermined sections or spots to expose portions of the first section 302 on edges thereof. In these embodiments, the portions of the first section 302 that are exposed may be the first connection mechanism 452 or the second connection mechanism 454. In some instances, the first section 302 may undergo additional processing to form the first connection mechanism 452 and/or the second connection mechanism 454.

Further, in some embodiments, the method 400 may be altered to produce a core member 204a comprising the first section 302 and the second section 304. In one embodiment, the vacuum forming process occurring in the process 400 may be intermittently turned off or interrupted. As a result, after the vacuum forming step of the process 400 is interrupted and, consequently, after the cells 414 bunch up during the process 400, a band 456 of thin plastic material may be produced. Then the reinforced material or second section 304 may be inserted into the aforementioned gap.

In a further embodiment, a section of the first section 302 may be run through a heated platen press or similar process to compress various sections of the first section 302 to create the bands 456 of compressed material into which the reinforced material or second section 304 may be inserted therein. It should be understood that the various compressed sections may be any shape (e.g., circular, square, polygonal, rectangular, etc.) and located at any position within the first section 302. Thus, the reinforced material or section 304 may be strategically inserted into any location in the first section 302.

Further, in this embodiment, the first section 302 of the core member 204a may be attached to the reinforced material or second section 304 along the first end 306a. Further, second sections 304 may also be attached to the first section 302 of the core member 204a. The second sections 304 attached to the core member 204a may be provided as a strip of solid or foamed thermoplastic material (HDPE or PP) in various dimensions.

Figure 9:
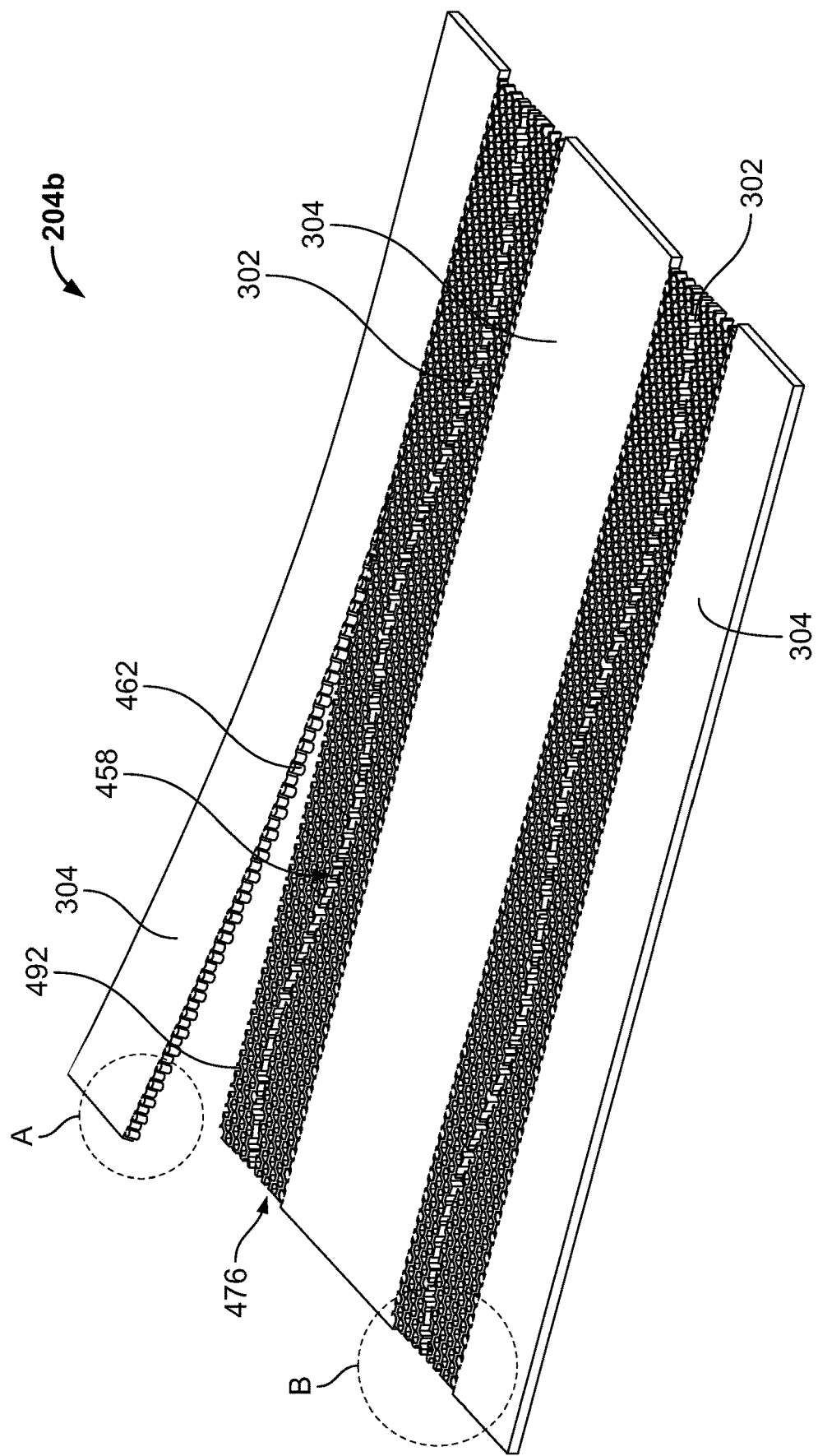
FIG. 9 is an isometric view of another embodiment of the inner core member of the composite panel of FIG. 2 including a primary structure and a reinforced material, and further including a plurality of seams in an assembled state and in a partially disassembled state.
Figure 10:
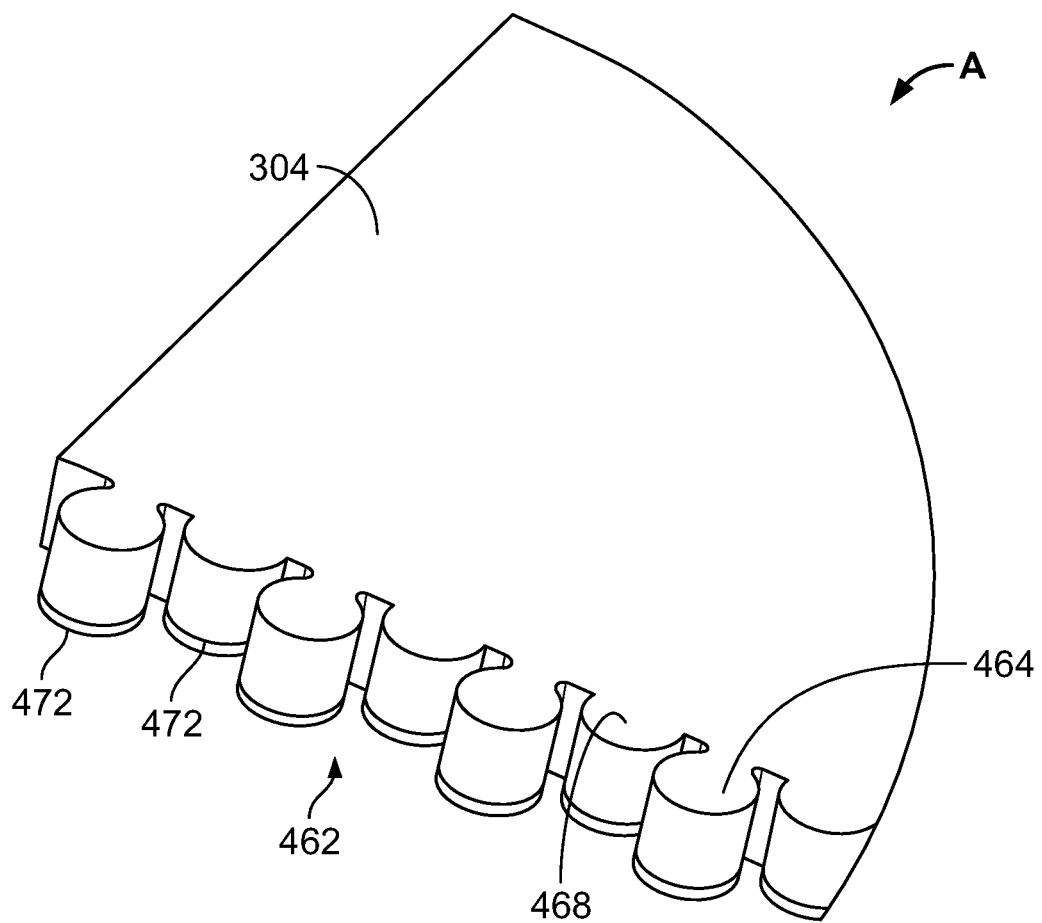
FIG. 10 is a partial isometric view of section A, as shown in FIG. 9.
Figure 11:
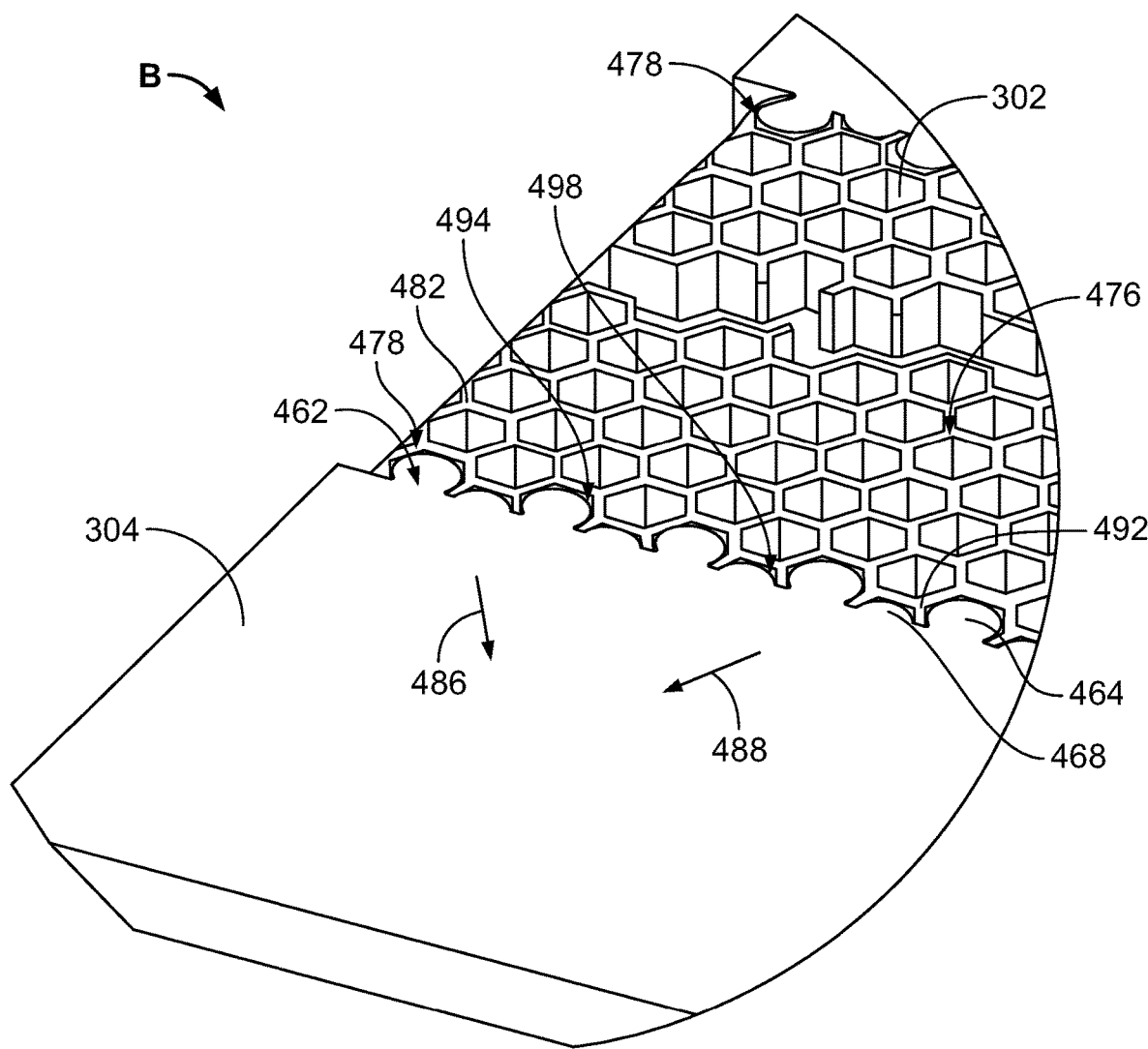
FIG. 11 is a partial isometric view of section B, as shown in FIG. 9.

FIGS. 9-11 depict a core member 204b including the first section 302 and the second section 304. In FIG. 9, the first section 302 has a break or gap 458 to exhibit that the first section 302 may be a variety of widths. In particular, the first sections 302 of the core member 204b may include one or more seams 450 (as described with respect to the process shown in FIGS. 6-8) to provide the first section 302 at a desired width and/or length.

As further illustrated in FIG. 9, the second sections 304 may include a connection mechanism 462 that may be used to connect the second sections 304 to the first sections 302. As shown in FIG. 10, in this particular embodiment, the connection mechanism 462 may be provided as one or more primary protrusions 464 and one or more secondary protrusions 468 that extend from the second sections 304. The primary protrusions 464 are formed as generally cylindrical extensions, e.g., rounded knobs. Similarly, the secondary protrusions 468 are formed as generally semi-cylindrical extensions, e.g., rounded teeth. To form the connection mechanism 462, in some embodiments, the primary protrusions 464 and the secondary protrusions 468 are arranged in an alternating pattern. In other words, in such embodiments, the primary protrusions 464 are separated from one another by the rounded secondary protrusions 468 and vice versa. Additionally, in some embodiments, the primary protrusions 464 and/or the secondary protrusions 468 define a lead-in feature 472, e.g., a chamfer, a radius, etc.

Further, in the embodiment of FIGS. 9-11, the first section 302 is provided as a plurality of honeycomb cells 476. As such, after placement of the second sections 304 relative to the first sections 302, the connection mechanism 462 may interlockingly connect and/or engage the first section 302 to the second section 304 to form a seam 478. In alternative embodiments, the connection mechanism 462 may be provided as other interlocking members, adhesive components, or any other components that may act to connect the first section 302 with the second section 304. In order to form the connection mechanism 462, the second section 304 may be cut at predetermined sections or spots.

More specifically, in the embodiment of FIGS. 9-11, each cell 476 is defined by a plurality of cell walls 482 arranged in a hexagonal pattern. Thus, neighboring cells 476 share a cell wall 482. Further, because the cell walls 482 are arranged in the hexagonal pattern, the cell walls 482 alternately extend diagonally outwardly from the first section 302 along a first direction 486 and an intersecting second direction 488 along cut sides 492 of the first section 302. Thus, along the cut sides 492, the cell walls 482 define alternating horseshoe-shaped first cavities 494 and trough-shaped second cavities 498. The primary protrusions 464 are configured to fit in the first cavities 494 and the secondary protrusions 468 are configured to fit in the second cavities 498. In some embodiments, the primary protrusions 464 and/or the secondary protrusions 468 are configured to interferingly fit in the first cavities 494 and the second cavities 498, respectively.

With reference to FIGS. 9-11, to assemble the first section 302 and the second section 304, the first section 302 and the second section 304 are arranged adjacent to one another such that the primary protrusions 464 overshadow the first cavities 494, the rounded teeth overshadow the second cavities 498, and the lead-in features 472 face the first section 302. Further, the primary protrusions 464 are pressed, e.g., by hand, with a pneumatic press, etc., into the first cavities 494 until the first section 302 and the second section 304 are flush with one another. As the primary protrusions 464 are inserted into the first cavities 494, the secondary protrusions 468 are correspondingly placed in the second cavities 498. It should be appreciated that the lead-in features 472 facilitate introduction of the primary protrusions 464 into the first cavities 494. Similarly, it should be appreciated that the lead-in features 472 facilitate introduction of the secondary protrusions 468 into the second cavities 498.

With reference again to FIGS. 9-11, when the first section 302 and the second section 304 are assembled together, the cell walls 482 along the cut sides 492 are disposed between and in contact with the primary protrusions 464 and the secondary protrusions 468. Thus, the primary protrusions 464 are captured by pairs of the cell walls 482 in the first cavities 494. In other words, pairs of the diagonally extending the cell walls 482 grasp the primary protrusions 464. In operation, the primary protrusions 464 and the secondary protrusions 468 alternately push against the cell walls 482 to resist sliding motion of the first section 302 relative to the second section 304. Additionally, in operation to resist separation of the first section 302 from the second section 304, the primary protrusions 464 pull against the cell walls 482. Similarly, in operation to resist separation of the first section 302 from the second section 304, the secondary protrusions 468 supportively push against the cell walls 482 to substantially prevent the cell walls 482 from rotating, e.g., bending, flexing, etc., outwardly relative to the first section 302, which would release the primary protrusions 464 from the first cavities 494. In other words, the primary protrusions 464 provide direct resistance and the secondary protrusions 468 provide indirect resistance against separation of the first section 302 from the second section 304. It should be appreciated that the secondary protrusions 468 work to substantially increase the strength of the seams 478.

After connection of the first section 302 with the second section 304 and after formation of the seam 478, the core member 204b may be provided to a lamination process. In particular, the seam 478 may allow the first section 302 and the second section 304 to stay connected during transportation of the core member 204b to further processing steps and/or may prevent unnecessary gaps from forming between the first section 302 and the second section 304 prior to lamination, attachment of sheets 200, 202, and/or other processes steps.

In further embodiments, the first section 302 of the core member 204 may be further attached to the second section 304 via a form of thermal welding using infrared, hot air, or other suitable technology. The end result may be an intermediate core with a unitary structure that comprises the first section 302 of the core member 204 being attached to the second section 304 along one or more edges and/or within areas thereof.

Figure 12:
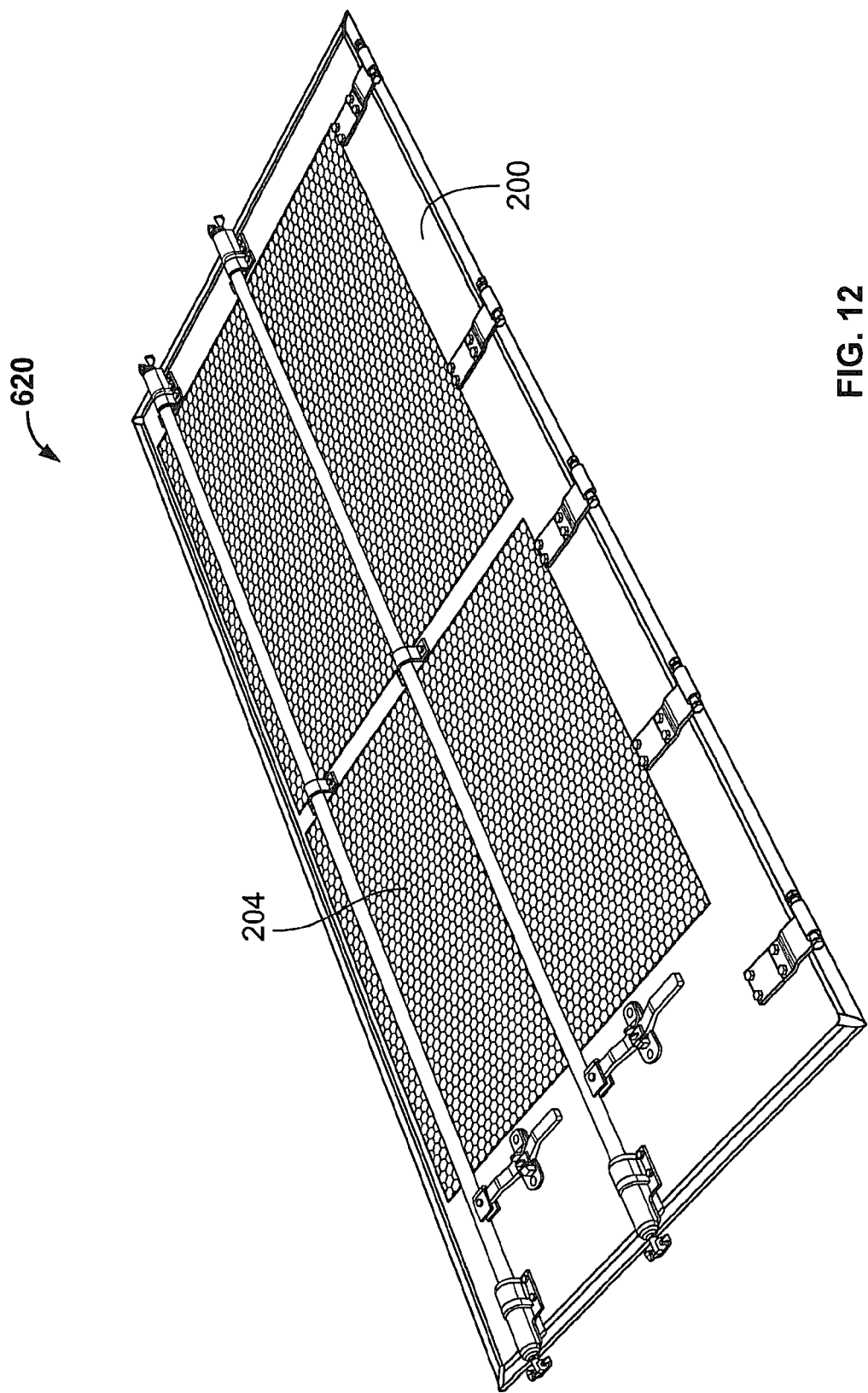
FIG. 12 is an isometric view of a trailer door including a composite panel according to an embodiment as described herein.

FIG. 12 depicts one application of the core member 204 according to the embodiments described herein. More specifically, in FIG. 12, the core member 204 is provided within one or more openings defined in a rear door 620 of the trailer 102 and at least portions of the inner sheet 200 and the outer sheet 202 may be provided on opposing sides of the core member 204. The core member 204 may be provided within a plurality of discrete or continuous areas that are reinforced according to the methods described herein. The reinforced areas of the core member 204 may correspond to the areas in which various door components are attached to the core member 204. For example, reinforced areas or second sections 304 may be provided at opposing ends of the door 620 and/or along the exterior edges of the door 620 where hinges, lock rod fastening, and/or other components are joined to the door 620. The reinforced material or second sections 304 may be provided in the core member 204 to help provide additional fastening strength, additional compression strength, increased puncture and impact resistance, and/or other structural requirements.

Although the composite panel 112 and the core member 204 discussed herein have been discussed with respect to a tractor trailer application, it should be appreciated that the composite panel 112, core member 204, and/or any associated parts may be used in other applications where lightweight panels may be used, such as, for example, other automotive and transportation applications including truck bodies, aircraft cargo containers, marine applications, furniture applications, architecture applications and building materials, packing materials and logistics applications, aerospace applications, and the like.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

What is claimed is:

1. A shipping trailer wall panel, comprising:
   a first partially hollow section including a first plurality of cell walls in a first pattern to form first hollow cells;
   a second partially hollow section including a second plurality of cell walls in a second pattern to form second hollow cells, the second partially hollow section connected to the first partially hollow section by interlocking the first plurality of cell walls with the second plurality of cell walls; and
   a reinforcing section connected to one or more of the first partially hollow section and the second partially hollow section.

2. The shipping trailer wall panel of claim 1, wherein:
   the first plurality of cell walls along a first cut side of the first partially hollow section form a plurality of female locking members; and
   the second plurality of cell walls along a second cut side of the second partially hollow section form a plurality of male locking members; and
   the plurality of female locking members and the plurality of male locking members are configured to interlock with one another.

3. The shipping trailer wall panel of claim 1, wherein the reinforcing section includes a plurality of primary protrusions configured to interlock with the first and second pluralities of cell walls.

4. The shipping trailer wall panel of claim 3, wherein the reinforcing section includes a plurality of secondary protrusions configured to interlock with the first and second pluralities of cell walls.

5. The shipping trailer wall panel of claim 4, wherein one or more of the plurality of primary protrusions and the plurality of secondary protrusions includes a lead-in feature.

6. The shipping trailer wall panel of claim 4, wherein the plurality of primary protrusions are formed as rounded knobs and the plurality of secondary protrusions are formed as rounded teeth.

7. The shipping trailer wall panel of claim 4, wherein, when the pluralities of first and second protrusions are interlocked with one or more of the first and second pluralities of cell walls, one of the cell walls is disposed between one of the primary protrusions and one of the secondary protrusions.

8. The shipping trailer wall panel of claim 4, wherein, when the primary protrusions are pulled against the cell walls, the secondary protrusions resist outward bending of the cell walls.

9. The shipping trailer wall panel of claim 4, wherein the plurality of primary protrusions and the plurality of secondary protrusions are arranged in an alternating pattern.

10. The shipping trailer wall panel of claim 4, wherein one or more of the plurality of primary protrusions and the plurality of secondary protrusions are configured to interferingly fit with the cell walls.

11. The shipping trailer wall panel of claim 1, wherein the first pattern and the second pattern each comprise a hexagonal pattern.

12. The shipping trailer wall panel of claim 1, wherein one or more of first partially hollow section and the second partially hollow section is further connected to the reinforcing section via one or more of adhesive bonding and thermal bonding.

13. The shipping trailer wall panel of claim 1, wherein the first partially hollow section and the second partially hollow section are adhesively bonded to one another.

14. The shipping trailer wall panel of claim 1, wherein the reinforcing section is disposed about the first partially hollow section and the second partially hollow section.

15. A composite panel, comprising:
    an inner sheet;
    an outer sheet opposite the inner sheet; and
    a core between the inner sheet and the outer sheet, the core comprising:
       a first honeycomb section including a plurality of cell walls forming a honeycomb pattern, and
       a reinforcing section including a plurality of primary protrusions, wherein the plurality of primary protrusions are configured to interlock with the cell walls.

16. The composite panel of claim 15, wherein the inner sheet and the outer sheet are adhesively bonded to the first honeycomb section and the reinforcing section.

17. The composite panel of claim 15, wherein the reinforcing section includes a plurality of secondary protrusions configured to interlock with the cell walls.

18. A trailer, comprising:
    a bottom rail;
    a top rail opposite the bottom rail; and
    a composite panel between the top rail and the bottom rail, the composite panel comprising:

a partially hollow section including a plurality of cell walls in a first pattern to create a plurality of hollow cells, and a reinforcing section including a plurality of primary protrusions, wherein the plurality of primary protrusions are configured to interlock with the cell walls.

19. The trailer of claim 18, wherein the reinforcing section includes a plurality of secondary protrusions configured to interlock with the cell walls.

20. The trailer of claim 18, wherein the top rail and the bottom rail are coupled to the composite panel via the reinforcing section.

\* \* \* \* \*